MAGNETIC-OPTICAL INFORMATION STORAGE UNIT AND APPARATUS

Filed Dec. 18, 1963

INVENTORS J. T. H. CHANG
J. F. DILLON, JR.
U. F. GIANOLA
BY [signature]
ATTORNEY

MAGNETIC-OPTICAL INFORMATION STORAGE UNIT AND APPARATUS

Filed Dec. 18, 1963 6 Sheets-Sheet 3

MAGNETIC-OPTICAL INFORMATION STORAGE UNIT AND APPARATUS

Filed Dec. 18, 1963 6 Sheets-Sheet 4

MAGNETIC-OPTICAL INFORMATION STORAGE UNIT AND APPARATUS

Filed Dec. 18, 1963 6 Sheets-Sheet 6

FIG. 7

| BASIC MATERIAL | ADDITIVE | | COMPENSATION TEMPERATURE |
|---|---|---|---|
| | MATERIAL | PROPORTIONS | |
| GADOLINIUM IRON GARNET | ALUMINUM OXIDE $Al_2O_3$ | 2 Al. IONS TO 98 Fe. IONS | 50°C. (122°F.) |
| GADOLINIUM IRON GARNET | ALUMINUM OXIDE $Al_2O_3$ | 1 Al. ION TO 99 Fe. IONS | 32°C. (90°F.) |
| GADOLINIUM IRON GARNET | —— | —— | 14°C. (57°F.) |
| TERBIUM IRON GARNET | —— | —— | -27°C. (-17°F.) |
| DYSPROSIUM IRON GARNET | —— | —— | -53°C. (-63°F.) |
| HOLMIUM IRON GARNET | —— | —— | -135°C. (-121°F.) |
| ERBIUM IRON GARNET | —— | —— | -189°C. (-308°F.) |

3,164,816
Patented Jan. 5, 1965

3,164,816

MAGNETIC-OPTICAL INFORMATION STORAGE UNIT AND APPARATUS

James T. H. Chang, Dunellen, Joseph F. Dillon, Jr., Morris Township, Morris County, and Umberto F. Gianola, Florham Park, N.J., assignors to Bell Telephone Laboratories, Incorporated, New York, N.Y., a corporation of New York Filed Dec. 18, 1963, Ser. No. 331,420
11 Claims. (Cl. 340—174)

This invention relates to large capacity optical random access memories and, more particularly, to a large capacity magnetic memory in which both reading and writing are accomplished by a beam of radiant energy.

As taught in the prior art, the storage regions should be as small and close together as possible. They should, nevertheless, have minimal interaction and stable, sharply defined thresholds for response to external disturbing influences. Moreover, the information stored in any single region should be quickly and readily changeable whenever desired without disturbing the information stored in surrounding regions.

Heretofore, as the information storage regions have been made smaller and closer together, some other desirable property has been sacrificed. For example, information may be stored on a photographic plate. The storage regions are small, close together and quite stable; but the information in a particular region can be changed only by preparing a new photographic plate.

A further example is provided by prior art semi-permanent magnetic memories of the selectively changeable type.

One proposal has been to take advantage of the vanishing of ferromagnetism beyond the Curie temperature. Selective writing would be done by heating a storage region with an electron beam, thus destroying the initially set magnetization. However, this approach has practical limitations. It requires a large temperature excursion. Excessive temperature excursions contribute to undesirable interaction between storage regions and require excessive periods for cooling and excessive power dissipation. In addition, the writing technique is not entirely compatible with any of the available reading techniques. Furthermore, no truly random access writing technique using the Curie point transition has been shown feasible.

It is therefore an object of this invention to achieve truly random access to a semi-permanent magnetic memory with a rapidly deflected beam of radiant energy.

An additional object of the invention is to provide more economical random access by dispensing with the individual connection to storage regions heretofore required in random access semi-permanent magnetic memories.

Another object of the invention is to obtain compatibility between writing and reading techniques in a random access semi-permanent memory.

Still another object of the invention is to reduce power dissipation in a large capacity optical random access memory.

A still further object of the invention is to reduce interaction between storage regions concurrently with the reduction in power dissipation to permit very large memories and very high densities of information storage.

According to the invention, information is stored by positively or negatively directed magnetization of the crystal sublattices of a sheet of ferrimagnetic material having a magnetic compensation temperature. In such a material, the net remanent magnetization is zero at the compensation temperature, although the magnetization contributions of the compensating sublattices are individually large. For proper operation, the ambient temperature of the material is maintained constant and approximately equal to the magnetic compensation temperature. To delineate a plurality of storage sites, the material is preferably striated or cut into segments. A pulse of radiant energy is focused into a beam and is deflected to a selected one of the storage regions in which information is to be stored or changed. Concurrently with the temperature change, the material in the selected region or site produces a spontaneous magnetization. Simultaneously, a pulsed external magnetizating source applies a magnetizing field uniformly across the entire sheet of material directed normally to the plane of the sheet in a positive or negative polarity that corresponds to binary input information. In the heated ferrimagnetic material at the selected site, the magnetizing field orients the magnetizations of the sublattices to yield minimum total energy. The respective sublattice magnetizations will be oppositely directed for opposite directions of the magnetizing field. Thus, information is stored in the directions of magnetization of the sublattices. Read-out of the stored information may be effected by polarized radiation, which is differently rotated by storage regions having opposite directions of the respective sublattice magnetizations.

To permit truly random access writing, the applied magnetizing field must have insufficient strength to affect the orientation of sublattice magnetizations at any unselected storage sites in the sheet. In other words, the coercivity of unselected sites must exceed the coercivity of selected sites, and the magnitude of the magnetizing field must lie between theses two values of coercivity. The material used in this invention satisfies this requirement in an exceptionally advantageous fashion because of a very high rate of change of coercivity with respect to temperature in the vicinity of the compensation temperature. The temperature excursions and the periods required for cooling the heated storage sites are much less than for prior art proposals to use Curie point writing.

Additional advantages inhere in the fact that the net magnetization is zero. The respective sublattice magnetizations can therefore be normal to the sheet without producing demagnetizing fields, which tend to degrade and destroy the stored information. Magnetization normal to the sheet produces the greatest optical rotation. Lack of demagnetizing fields permits the sublattice magnetizations to be maintained normal to the sheet in a sheet thin enough to be substantially transparent to light.

Although the frequency of the writing radiation is preferably chosen to yield substantial absorption by the material at the selected site, and the frequency of the reading radiation is preferably chosen to afford good transmission and polarization rotation of the radiation by the material at the selected site, these requirements can be satisfied by using the same frequency of radiation for both reading and writing.

It is characteristic of the invention that realignment of the sublattice magnetizations occurs within at the most a few microseconds upon the concurrence of the heat pulse and the magnetizing field pulse. If desired, the selected site may be tested to determine what information has been stored even before the material has cooled appreciably.

Any ferrimagnetic material having a suitable magnetic compensation temperature, optical transparency and large polarization rotation at the compensation temperature may be used in information storage units and apparatus according to the invention. Certain rare earth ion garnets are examples of suitable materials. In particular, gadolinium iron garnet with an aluminum oxide additive is especially suitable because the magnetic compensation temperature is slightly higher than the usual room temperature. Therefore, the material may be held at an ambient temperature equal to the magnetic compensation temperature in the regulated oven instead of a regulated refrigerating unit. Crystals of this material also display adequate optical transparency and polarization rotation.

Additional features and advantages of the invention will become apparent from the detailed description and the accompanying drawings in which:

FIG. 7 is a table showing composition and magnetic compensation temperatures of some preferred materials usable in information storage units and apparatus according to the invention.

Figure 1:
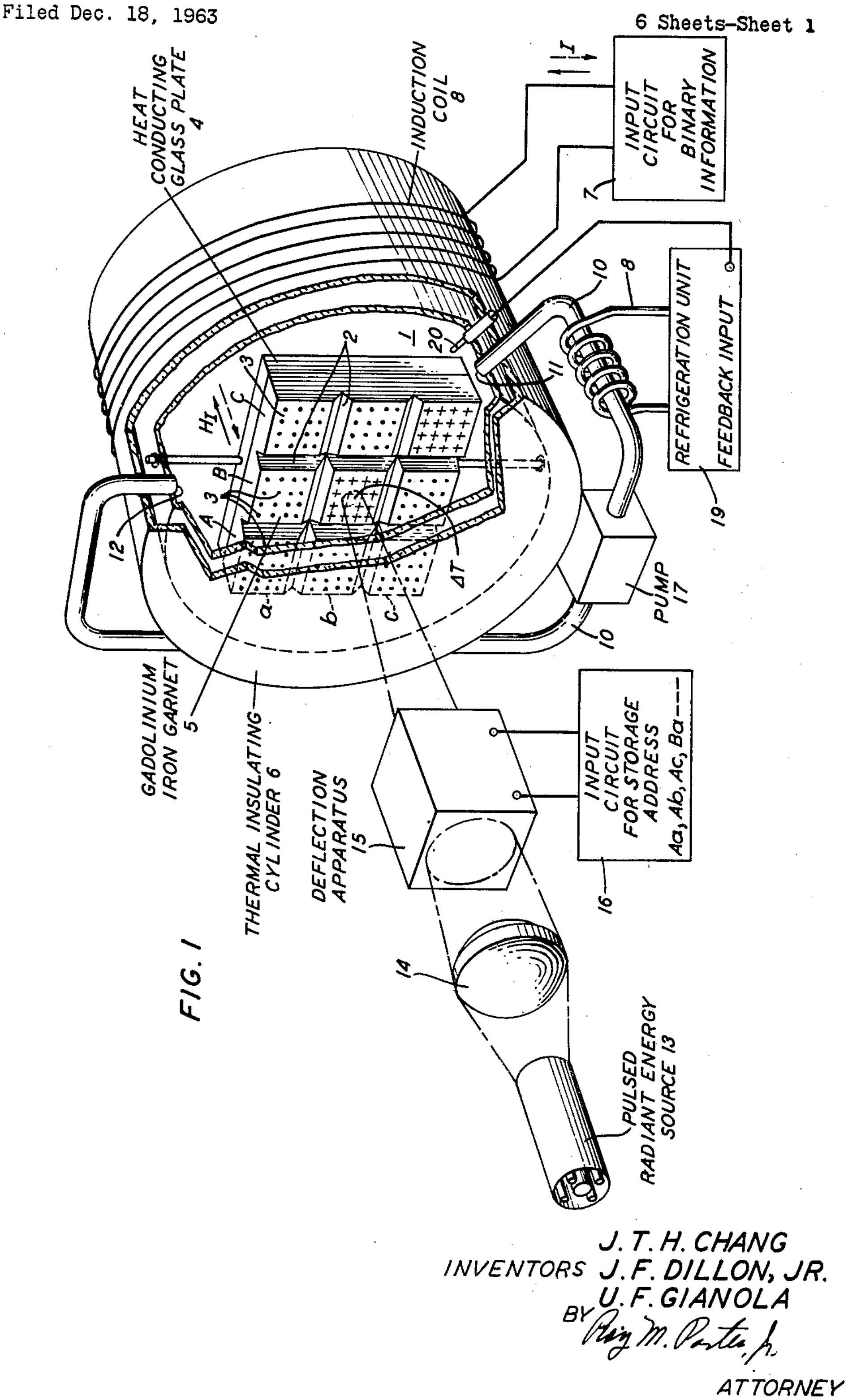
FIG. 1 is partially pictorial and partially block diagrammatic showing of a preferred embodiment of the invention.

FIG. 1 shows information storage apparatus according to the invention. It comprises an information storage unit 1, including the crystal 5 and the mounting plate 4. In addition, the apparatus includes means for putting information into the unit. The process of putting information into the unit is commonly termed "writing."

In the unit 1, the information is stored in two different orientations of sublattice magnetization of each segment 3 of a crystal 5 of gadolinium iron garnet. Gadolinium iron garnet is a synthetically produced crystal in which iron atoms populate in unequal numbers two types of crystalline sites, together comprising the iron sublattice in the crystal, as explained by the inventor Dillon in The Smithsonian Report for 1960, Washington, 1961, pages 385–404, especially pages 386 and 387. Within any single magnetic domain of the crystal, the iron atoms in one of these two crystalline sites align themselves magnetically antiparallel to the iron atoms in the other of the two crystalline sites, but still produce a net magnetization because of their unequal populations in the two crystalline sites.

Within that same magnetic domain of the crystal, there is a gadolinium sublattice that has a magnetization that is aligned magnetically antiparallel to the net magnetization of iron sublattice. The gadolinium sublattice has, at most temperatures, a magnetization that is greater or less than the net magnetization of iron sublattice. Thus gadolinium iron garnet is said to be a ferrimagnetic material with inequivalent sublattices.

Nevertheless, at a temperature slightly below room temperature, the gadolinium sublattice magnetization exactly equals the net magnetization of the iron sublattice, so that the total magnetization of the crystal is zero. This temperature, about 14 degrees centigrade, is called the magnetic compensation temperature because the inequivalent sublattices now exactly compensate each other magnetically. Additional information concerning the physical basis of this phenomenon may be found in Belov, Magnetic Transitions, Consultants' Bureau, New York, 1961, pp. 176–182.

The magnetizations of the gadolinium sublattice and of the iron sublattice are pointed in a direction perpendicular to the major surface of the crystal 5. This direction is called the "easy axis," or preferred axis, of magnetization. It is made to be perpendicular to the major surface, for example, by the strains induced by polishing this surface. Preferably, the crystal is provided with two parallel major surfaces that are both optically polished. Transparent dielectric coatings on these surfaces may be provided to reduce reflections at the respective interfaces with air and glass plate 4.

At the magnetic compensation temperature, forces within any one crystal segment 3 tend to produce a single magnetic domain, that is, a uniform polarity of the net iron sublattice magnetization and the opposite uniform polarity of the gadolinium sublattice magnetization, even though the crystal segment 3 has no net magnetization. The uniform orientation of crystalline sublattice magnetizations within a crystal segment 3 at the magnetic compensation temperature is very stable and has a very high threshold for response to disturbing magnetic fields, as a result of its high coercivity.

According to a feature of the invention, the striations or grooves 2 decouple different crystal segments 3 so that directions of crystalline sublattice magnetizations in adjacent crystal segments 3 may be the same or different, even at an ambient temperature equal to the magnetic compensation temperature. Thus, each segment 3 is a separate information storage site. Alternatively, the segments 3 might be cut apart; but the grooves 2 permit simpler, easier fabricating techniques because the grooving is less likely to cause irregular fractures than cutting the segments 3 entirely apart. As a representative example, each side of each crystal segment 3 is about 0.003 inch long; and each segment is about 0.001 inch thick. Segmenting or striating in the manners described above is preferred but is not an essential requirement. A continuous sheet without grooves might also be suitable provided that a sufficient energy barrier is provided between storage regions to prevent interaction.

In order to store informaton in a selected segment 3 at a location or address A*a*, A*b*, A*c*, B*a*, et cetera, in ferrimagnetic crystal 5, applicants provide a pulse of radiant energy from source 13. One such source is a concentrated arc lamp such as OSRAM No. 0339MR. Another such source is an optical maser. After focusing by lens 14, the radiant energy pulse is directed by deflection apparatus 15 toward the segment 3 having the address, for example, B*b*, provided from address input circuit 16. Deflection apparatus 15 may preferably comprise an apparatus of the type described in the copending application of T. J. Nelson, Serial No. 239,948, filed November 26, 1962.

Figure 2:
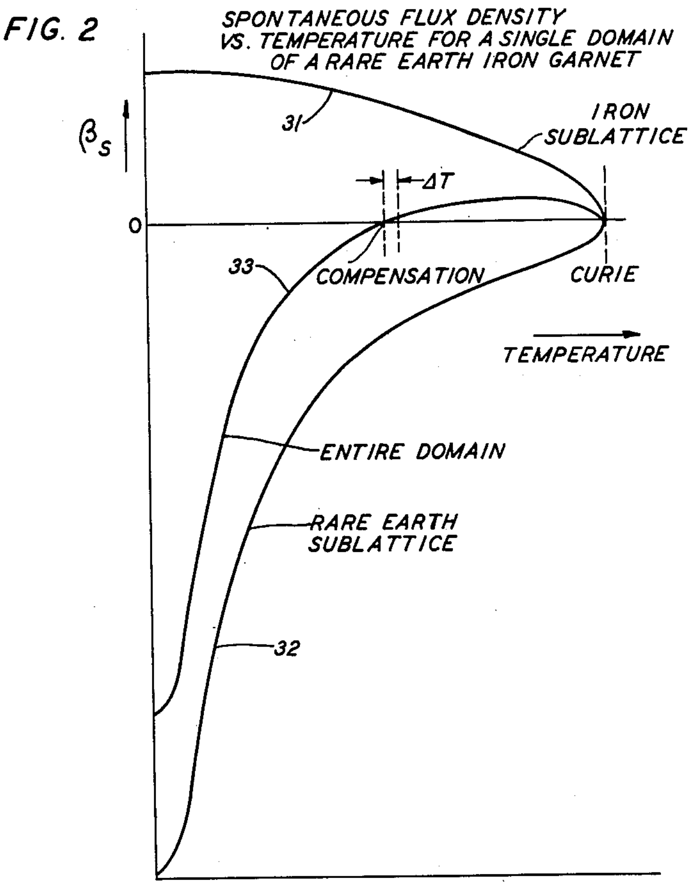
FIG. 2 and FIG. 3 show curves that facilitate understanding of the characteristics of the magnetic materials used in information storage units and apparatus according to the invention.

The radiant energy pulse raises the temperature of segment 3 at address B*b* above the magnetic compensation temperature and induces a spontaneous magnetic flux therein, as shown by curve 33 of FIG. 2. Because of the nature of the corecivity variation with temperature, as shown in curve 40 of FIG. 3, only a small temperature excursion is needed, thus conserving heat power required. In gadolinium iron garnet a temperature excursion of only 4 degrees centigrade is considered sufficient for practical usage.

Binary information input circuit 7 applies the current I to coil 8 with a magnitude that produces a magnetizing field $H_I$ of a magnitude as discussed below and with a binary information responsive polarity that produces a binary information responsive orientation of the sublattice magnetizations of segment 3 at address B*b*. It may be noted that information storage might also be obtained by cooling segment 3 at address B*b* below the compensation temperature, as may be comprehended from curve 33 of FIG. 2.

After one irradiated segment has cooled to an ambient temperature nearly equal to the magnetic compensation temperature, another may be heated; and the storing of information is continued as described above until binary information is stored in each segment 3 in the form of desired orientations of the gadolinium and iron sublattice magnetizations within that segment.

Figure 3:
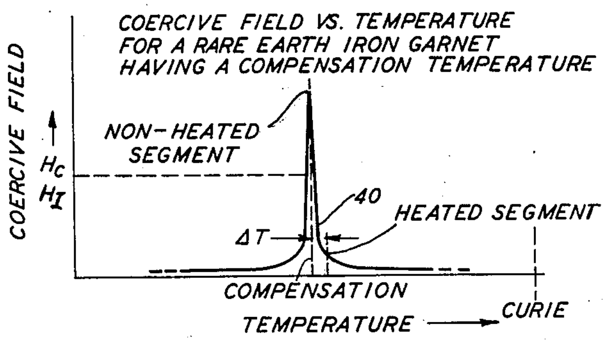

The magnetizing field $H_I$ must be equal to or greater than the coercive field $H_c$ for the selected segment 3 that is heated by the radiant energy beam, but less than the coercive field $H_c$, for the segments 3 that are not thus irradiated, as shown in curve 40 of FIG. 3. Then the magnetizing field $H_I$ will coerce or compel a realignment of the magnetization of the crystal sublattices of the selected segment 3 so that its transient net magnetization is aiding polarity with the flux produced by the magnetizing field, while not disturbing orientations of sublattices in the other segments. Thus, true random access writing capability is obtained.

For obtainable purity of the crystal 5 and obtainable accuracy of the magnetizing field $H_I$, it is possible to prevent realigning unheated sites with only about 4 degrees centigrade change in temperature ($\Delta T=4°$ C.) at the heated site. This desirable operating characteristic results from the relatively great rate of change of the coercivity with respect to temperature near the compensation temperature, as shown in FIG. 3.

In FIG. 1, the ambient temperature is stabilized near the compensation temperature of gadolinium iron garnet crystal 5 by a suitable refrigerant. Pump 17, hoses 10, inlet 11, and outlet 12 circulate the refrigerant around crystal 5 within thermos bottle-like cylinder 6 having end faces that are transparent to radiation from source 13. Refrigeration unit 19 and cooling coil 18 cool the refrigerant as needed in response to the temperature measurement made by thermistor or thermocouple 20. Heat conducting glass plate 4 attached to the unradiated side of crystal 5 provides support for the crystal and participates in heat transfer therefrom. Plate 4 is about 1/16 inch thick. Other refrigeration means are of course equally suitable, for example, Peltier cooling. We may also reiterate that a garnet with a compensation point above room temperature may be maintained more simply in an oven.

Figure 4:
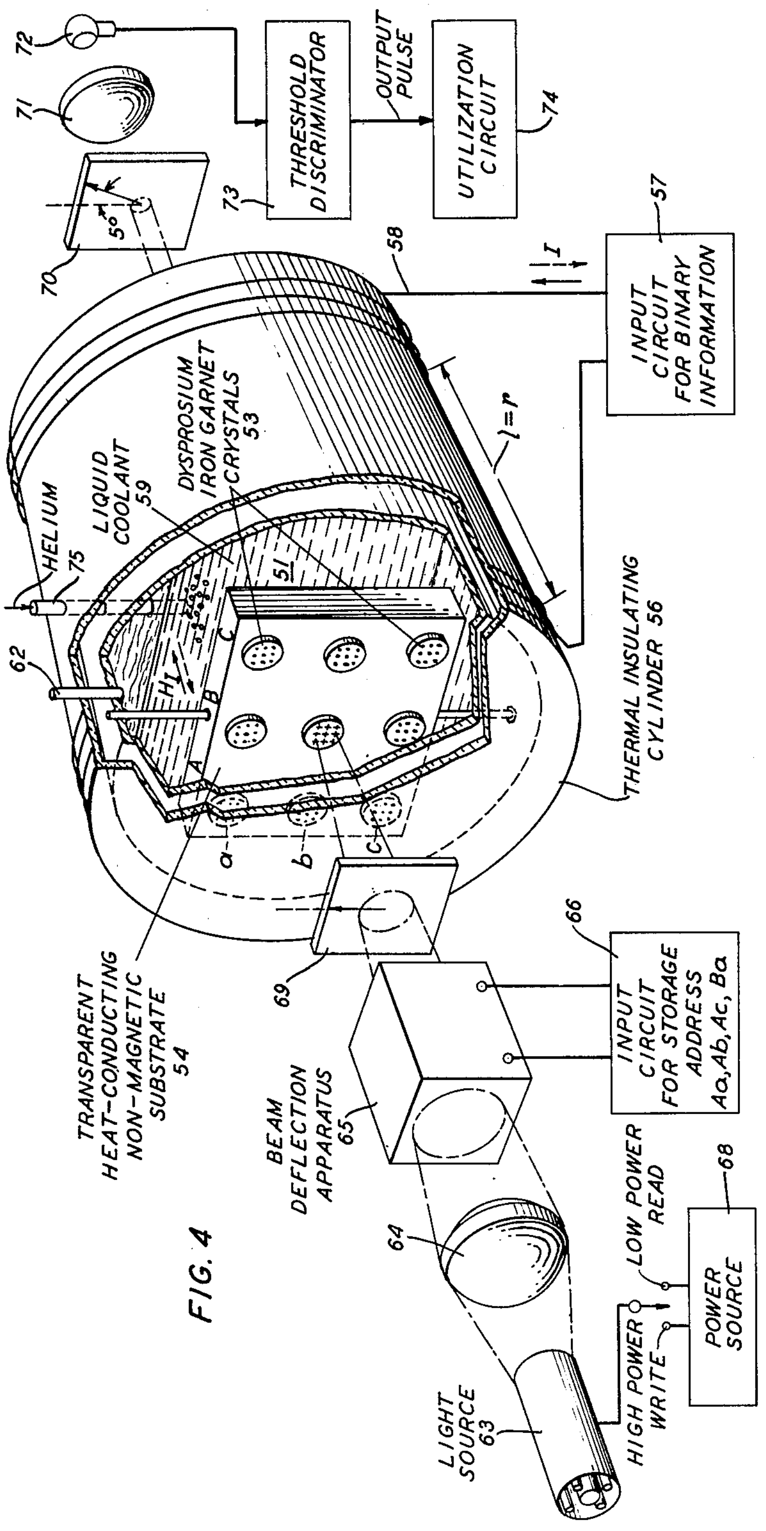
FIG. 4 is a partially pictorial and partially block diagrammatic showing of various modifications of the embodiment of FIG. 1.

FIG. 4 illustrates a modified embodiment of the invention that differs in several particulars from the embodiment of FIG. 1 and additionally includes apparatus for recalling information stored in the ferrimagnetic crystal. The process of recalling stored information is referred to in the art as "reading out" or "retrieving" the information.

In FIG. 4, a plurality of crystals 53 of dysprosium iron garnet are mounted on a transparent heat-conducting nonmagnetic substrate 54, which may be the same as glass plate 4 of FIG. 1. The crystals 53 are each 0.001 inch thick and 0.003 inch in diameter, as a representative example.

Dysprosium iron garnet has a compensation temperature of about minus 63 degrees centigrade.

Helium gas is introduced into cylinder 56 through tube 75 and is bubbled through the coolant liquid 59 at a level above memory unit 51. The coolant liquid tends to evaporate into the helium bubbles, thereby removing heat from the coolant fluid. By controlling the flow of helium, the temperature of the coolant liquid 59 may be controlled. In particular, boiling of the coolant liquid is prevented by this method of temperature control; and no bubbles occur in the paths of the reading or writing beam from source 63. The coolant vapor is allowed to pass into the atmosphere through vent 62 in transparent thermal insulating cylinder 56.

Light source 63 is connected to the high power output of power source 68 during the writing process. Coil 58 is a Helmholtz coil, which is one alternative to the solenoid 8 of FIG. 1 and differs therefrom in that it consists of two separate coils spaced at a distance equal to the radius of insulating cylinder 56. They may be connected either in series or in parallel; and, in either case, they will provide a uniform magnetizing field through crystals 53. Information is written into unit 51 in the manner described for unit 1 in the embodiment of FIG. 1.

Stored information preferably may be read out of crystals 53 according to the teaching of R. C. Sherwood et al., United States Patent No. 3,059,538. Thus, a polarizer 69 is placed between deflection apparatus 65 and crystals 53, and an analyzer 70, lens 71 and photoelectric cell 72 are placed in that order on the side of crystals 53 opposite polarizer 69.

During the reading process, light source 63 is switched to the low power output of source 68, because it is not necessary or desirable to heat the crystals 53 during reading. The radiation absorption during reading is preferably much less intense than during writing. The radiation is directed by deflection apparatus 65 toward the crystal 53 at the coordinate location determined by input circuit 66. After linear polarization by polarizer 69, the light passes through a crystal 53, for example, at address B*b*. The polarization of the light will be rotated in one sense for one orientation of the magnetization of the iron sublattice of the crystal, and in the opposite sense for the opposite orientation of the magnetization of the iron sublattice. A crystal of dysprosium iron garnet 0.001 inch thick will rotate the polarization of yellow light about five degrees. Likewise, in the embodiment of FIG. 1, a crystal of gadolinium iron garnet 0.001 inch thick will rotate the polarization of yellow light about five degrees. Lower frequencies of radiation will experience rotation of polarization to a lesser degree.

It is important to note that the rotation occurs in spite of the fact that the net magnetization of the crystal is zero at its magnetic compensation temperature. This fact may be explained by the tentative theory, by which applicants do not wish in any way to limit the invention, that the rotation depends solely on the orientation of the magnetization of the ionic iron atoms in one of the two types of crystalline sites within the iron sublattice. More generally, it may be said that the sense of rotation of polarization depends on the orientation of the magnetization of the iron sublattice.

Analyzer 70 is set to extinguish or nearly extinguish light that has polarization rotated in one sense. Consequently, it will pass a substantial amount of light that has polarization rotated in the opposite sense. Photocell 72 feeds its output signal to a threshold discrimination circuit 73 in order to give an output pulse into the utilization circuit 74 only for the greater amount of transmitted light.

The presence of a pulse and the absence of a pulse from photoelectric cell 72 represent the same binary information as was represented by one polarity of the current I and the opposite polarity of the current I, respectively, from binary information input circuit 57 during the writing process.

A similar arrangement may be provided for retrieving the stored information of the embodiment of FIG. 1 by inserting polarizer, analyzer, lens, photoelectric cell and associated circuits in the same relative positions as in the embodiment of FIG. 2.

Any technique for determining the orientations of the sublattice magnetizations of the ferrimagnetic crystals might be used for reading information out of the storage units 1 or 51. If the technique is not optical in nature, the storage unit, including crystal and mounting substrate, may be transferred to an appropriate apparatus. Applicants' invention relates primarily to the storing, or writing, of information in ferrimagnetic material having a magnetic compensation temperature. The preferred embodiment, nevertheless, has the capability of using the same radiant energy source for both writing and reading operations.

The ferrimagnetic materials that may be used with applicants' invention include any of those having a magnetic compensation temperature, i.e., a temperature at which magnetically inequivalent sublattices produce zero net magnetization, and preferably appropriate optical qualities. These materials include, among the presently preferred ones for applicants' apparatus, dysprosium iron garnet, erbium iron garnet, gadolinium iron garnet, holmium iron garnet, and terbium iron garnet and gadolinium iron garnet in which metallic ions such as aluminum ions are substituted for a small part of the iron (Fe) ions. The compensation temperatures for these rare earth materials are listed in the table of FIG. 7. These materials may be combined to produce a crystal lattice containing two types of ionic rare earth atoms and giving intermediate values of compensation temperature.

While the materials discussed above do not exhaust all the possible ferrimagnetic materials having compensation temperatures, garnet-type ferrimagnetic materials are preferred by applicants because they may be fabricated according to the teachings of J. W. Nielsen in United States Patent No. 2,957,827, issued October 25, 1960, and in United States Patent No. 3,050,407, issued August 21, 1962. The techniques described in the latter patent for introducing coloring additives are equally effective for introducing additives such as aluminum oxide for raising the magnetic compensation temperature, whenever the material would have a compensation temperature in the absence of the additive.

Figure 5:
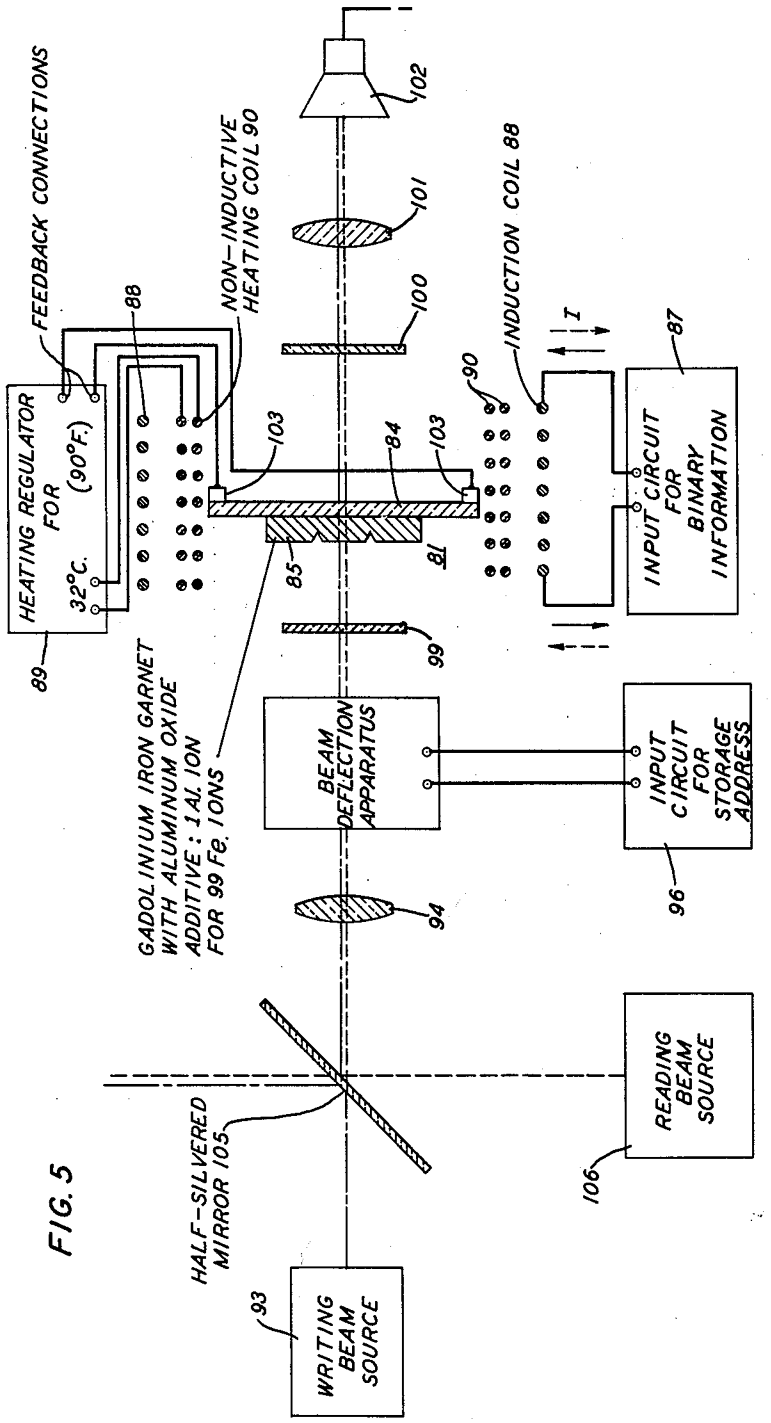
FIG. 5 is a partially pictorial and partially block diagrammatic showing of a preferred embodiment of the invention utilizing temperature control by heating.

FIG. 5 illustrates a modified embodiment of the invention in which a crystal 85 of gadolinium iron garnet with an aluminum oxide additive is used as the information storage material. The compensation temperature is raised to approximately 32 degrees centigrade (90° F.) with the addition of one (1) aluminum atom for each 99 iron atoms. That is, one (1) out of 100 iron atoms are displaced by aluminum atoms. In most terrestrial environments, a heating coil 90, which is wound to eliminate inductive coupling with the crystal 85, may be used to maintain the storage unit 81, including crystal 85 and mounting plate 84, at an ambient temperature approximately equal to the compensation temperature. Thermistors or thermocouples 103 sense the temperature at the edges of mounting plate 84 and feed corresponding electrical signals to regulator 89 in a polarity to counteract fluctuations in the temperature of the surrounding environment. This regulated heating arrangement is highly preferred for the present invention, because it is generally easier to regulate the temperature of a material by heating it rather than cooling it.

In FIG. 5, reading source 106 provides energy of lower intensity than writing source 93 and of appropriate frequency, preferably yellow light, in order to retrieve information from unit 81. The rotation of polarization is greater for yellow light than for lower frequencies; and the transparency of the crystal 85 is higher for yellow light than for still higher frequencies. The optimum frequency for reading differs for different ferrimagnetic materials having a compensation temperature.

A half-silvered mirror 105 enables the beams from radiant energy sources 93 and 106 to enter beam deflection apparatus 95 at the same point from the same direction, so that either beam will strike the same segment 83 in response to the same storage address from address input circuit 96. Note, however, that the use of a single source, as in the preferred embodiments of FIGS. 1 and 4, eliminates the problem of registration of the reading and writing beams at the storage crystal 85.

The portions of the beams in the embodiment of FIG. 5 that are directed away from lens 94 by mirror 105 may be utilized to write information into, or read information out of, a second storage unit like unit 81.

Figure 6:
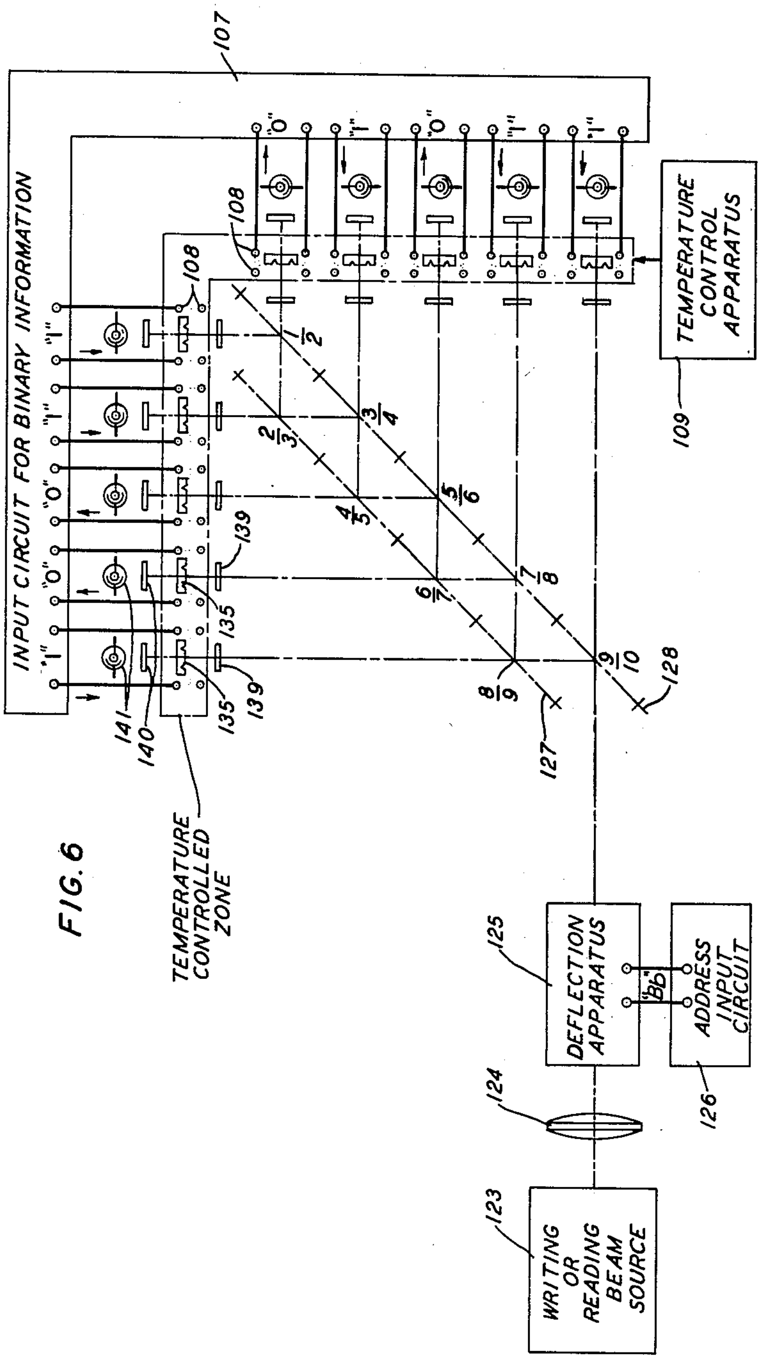
FIG. 6 is a partially pictorial and partially block diagrammatic showing of a preferred embodiment of the invention providing multichannel storing of information.

An embodiment of the invention having a more elaborate system of partially silvered mirrors is illustrated in FIG. 6. A radiant energy beam is projected from source 123 and is deflected by deflection apparatus 125 in response to address input circuit 126. The deflected beam is split into ten equal parts by parallel partially silvered mirrors 127 and 128. The silvering of the mirrors necessary in a zone in the vicinity of each reflection point is indicated quantitatively by the fraction of light reflected. The boundaries of each of these zones are indicated by cross-markings on mirrors 127 and 128 in FIG. 6. The extent of these zones is determined by the need to maintain the proper division of the beam intensity as it is deflected by deflection apparatus 125. The ten equal-intensity parts strike segments in like relative positions, i.e., B*b*, in ten different gadolinium iron garnet crystals 135 that are striated as shown in FIG. 1. Each of the Helmholtz coils 108, arranged in the fashion of coil 58 of FIG. 4, is energized by a current of polarity representing a "1" or a "0" of the binary information from input circuit 107. FIG. 6 shows how the binary number 1001101011, reading from left to right and then downward along input circuit 107, might be represented by the two polarities of currents in Helmholtz coils 108. Each one of the binary digits is stored in a corresponding orientation of the crystalline sublattice magnetizations at address "B*b*" in its crystal 135. Reading is accomplished in the manner of FIG. 4, with each of the photoelectric cells 141 delivering a pulse for a stored "1" and no pulse for a stored "0."

The arrangement of FIG. 6 permits increased speed in the storing and retrieval of information. Such an arrangement may be referred to as a "parallel input/output" storage apparatus, or as a "multichannel" storage apparatus.

As a further modification of the illustrative embodiments of the invention, it is apparent that any sort of apparatus for deflecting a light beam, such as movable mirrors, might be substituted for deflection apparatus 125.

Information storage apparatus according to the invention can be favorably compared with one particular large capacity random access memory that provides excellent density of information storage and rapid selective changeability of previously stored information. A focused beam of radiant energy is deflected to different regions within a thin sheet of an alkali halide, such as potassium chloride. One frequency of radiation, F, can excite electrons at the irradiated location from a first elevated energy level in which they were trapped to a second energy level in which they are again trapped. And a second frequency, F′, can excite them back to the first trapping level without letting them fall to their normal energy level. In these bilevel transitions, the incident radiation is partially absorbed, so that the absorption is a detectable indication of the information previously stored in the irradiated location, even though the stored information may be thereby changed. The greatest disadvantage of such information storage apparatus is that stray radiation of the F or F′ frequencies, however faint, can cause electronic transitions between the first and second trapping levels and, consequently, gradually cause unwanted loss of the stored information.

Information storage apparatus according to the present invention provides, in contrast to the apparatus just described, comparable density and selective changeability of information storage, yet avoids the gradual loss of stored information because of its stable coercivity at the compensation temperature, as described above.

The above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. Information storage apparatus comprising a ferrimagnetic crystalline material having a characteristic of stable crystalline sublattice magnetizations attending a condition of negligible total spontaneous magnetization, said material having a plurality of storage sites, means for reducing the coercivity of said material at a selected one of said sites relative to the coercivity of said material at the remainder of said sites, and means external to said material for applying perpendicular to said surface a magnetic field having an input binary information responsive polarity and having a magnitude sufficient to align said sublattice magnetizations of said material at said selected site in a responsive polarity but insufficient to disturb said sublattice magnetizations in said material at the remainder of said sites.

2. Information storage apparatus according to claim 1 in which the ferrimagnetic crystalline material includes a rare earth iron garnet having the characteristic of stable crystalline sublattice magnetizations attending a condition of negligible net spontaneous magnetization at an ambient temperature called the magnetic compensation temperature of said material, said apparatus including means for maintaining said ambient temperature for said material.

3. Information storage apparatus according to claim 1 in which the coercivity reducing means comprises a source of a beam of radiant energy and means for deflecting said beam toward the selected site, said beam being partially absorbable by said material, said apparatus further comprising means for employing said beam source to read the binary information out of said material.

4. Information storage apparatus according to claim 1 in which the ferrimagnetic crystalline material also includes metallic atoms substituted for part of the iron atoms in said material.

5. Information storage apparatus according to claim 1 in which the ferrimagnetic crystalline material includes gadolinium iron garnet and some metallic atoms substituted for part of the iron atoms in said garnet.

6. Information storage apparatus according to claim 5 in which the ambient temperature maintaining means includes means for heating said material.

7. Information storage apparatus comprising ferrimagnetic crystalline material having magnetically opposed sublattices that produce one polarity of spontaneous magnetization below a particular temperature of said material and the opposite polarity of spontaneous magnetization above said particular temperature, means for providing a plurality of storage elements each including a portion of said material, means for controlling the temperatures of said elements to reduce the coercivity of one of said elements relative to the coercivity of the remainder of said elements, and means for applying to all of said elements a magnetizing field having an input binary information responsive polarity and having a magnitude exceeding said coercivity in said one element and less than said coercivity in the remainder of said elements.

8. Information storage apparatus according to claim 7 in which the means for controlling the temperatures of the storage elements comprises a feedback control system adapted for opposing deviations of the ambient temperatures from the particular temperature and means for directing a beam of temperature-raising radiant energy at the one element to heat said one element transiently to a temperature differing from said particular temperature more than said ambient temperatures of the remainder of said elements.

9. Information storage apparatus according to claim 8 additionally including at least two parallel partially silvered mirrors situated between the beam directing means and the storage elements, said mirrors having a plurality of different regions characterized by different degrees of silvering for splitting the beam of temperature-raising energy into a plurality of beams having substantially equal intensity, the magnetic field applying means comprising a plurality of magnetizing coils each encompassing a portion of said elements, each said portion of said elements intercepting one of said plurality of beams.

10. An information storage unit comprising a sheet of rare earth iron garnet material having a characteristic of stable crystalline sublattice magnetizations attending a condition of negligible spontaneous net magnetization at a particular temperature called the magnetic compensation temperature of said material, said material having a surface bearing a plurality of intersecting striations separating a plurality of regions that have independent remanent capabilities of said compensation temperature for rotating the direction of polarization of incident radiation in one of two opposite senses, said remanent capabilities being representative of binary information.

11. An information storage unit comprising a transparent, heat-conducting non-magnetic substrate, and a plurality of crystals of a ferrimagnetic material having a magnetic compensation temperature, said plurality of crystals being mounted upon said substrate, said crystals having polished major surfaces and preferred axes of magnetization perpendicular to said major surfaces.

No references cited.